(12) United States Patent
Poustchi et al.

(10) Patent No.: US 12,395,375 B2
(45) Date of Patent: Aug. 19, 2025

(54) FAULT TOLERANT DISTRIBUTED COMPUTING

(71) Applicant: AKIMBO TECHNOLOGIES INC., North Vancouver (CA)

(72) Inventors: Behrouz Poustchi, North Vancouver (CA); Jean-philippe Lemieux, North Vancouver (CA)

(73) Assignee: AKIMBO TECHNOLOGIES INC., British Columbia (CA)

( * ) Notice: Subject to any disclaimer, the term of this patent is extended or adjusted under 35 U.S.C. 154(b) by 185 days.

(21) Appl. No.: 17/918,690

(22) PCT Filed: Apr. 15, 2021

(86) PCT No.: PCT/CA2021/050509
§ 371 (c)(1),
(2) Date: Oct. 13, 2022

(87) PCT Pub. No.: WO2021/207845
PCT Pub. Date: Oct. 21, 2021

(65) Prior Publication Data
US 2023/0300000 A1    Sep. 21, 2023

Related U.S. Application Data

(60) Provisional application No. 63/010,433, filed on Apr. 15, 2020.

(51) Int. Cl.
*H04L 12/40* (2006.01)
*H04L 69/40* (2022.01)

(52) U.S. Cl.
CPC .......... *H04L 12/4015* (2013.01); *H04L 69/40* (2013.01); *H04L 2012/40215* (2013.01)

(58) Field of Classification Search
CPC ................. H04L 12/4015; H04L 69/40; H04L 2012/40215
See application file for complete search history.

(56) References Cited

U.S. PATENT DOCUMENTS

| | | | |
|---|---|---|---|
| 5,257,369 A | 10/1993 | Skeen et al. | |
| 10,326,643 B2 * | 6/2019 | Beilin | H04L 43/10 |
| 10,356,203 B2 * | 7/2019 | Beilin | H04W 4/48 |
| 11,128,650 B2 * | 9/2021 | Hartkopp | G07C 5/008 |

(Continued)

OTHER PUBLICATIONS

International Search Report and Written Opinion for PCT/CA2021/050509, mailed Jul. 5, 2021, 12 pages.

(Continued)

*Primary Examiner* — Chandrahas B Patel
(74) *Attorney, Agent, or Firm* — Klarquist Sparkman, LLP

(57) ABSTRACT

Methods, systems, and techniques for fault tolerant distributed computing. At least three fault tolerant messages are generated. The generating involves obtaining a first initial message identifier; mapping the initial message identifier to at least three different fault tolerant identifiers; and using the at least three different fault tolerant identifiers to identify the at least three fault tolerant messages. The at least three fault tolerant messages are then transmitted along at least one communication channel. The at least one communication channel may be a Controller Area Network (CAN) bus and the initial message identifier may be a CAN identifier.

26 Claims, 12 Drawing Sheets

(56) References Cited

U.S. PATENT DOCUMENTS

| | | | |
|---|---|---|---|
| 11,567,818 | B2 | 1/2023 | Poustchi et al. |
| 2002/0144175 | A1 | 10/2002 | Long et al. |
| 2007/0067663 | A1 | 3/2007 | Surasinghe |
| 2012/0142359 | A1 | 6/2012 | Lewis et al. |
| 2014/0023068 | A1 | 1/2014 | Kim et al. |
| 2014/0337976 | A1 | 11/2014 | Moeller et al. |
| 2019/0075194 | A1* | 3/2019 | Stengler .............. H04L 41/0654 |
| 2020/0067956 | A1 | 2/2020 | Hartkopp et al. |

OTHER PUBLICATIONS

Algirdas Avižienis, Jean-Claude Laprie, Brian Randell, and Carl Landwehr, "Basic concepts and taxonomy of dependable and secure computing", *IEEE Transactions on Dependable and Secure Computing*, Oct. 2004, vol. 1, Issue 1, pp. 11-33.

Miguel Correia, Nuno Ferreira Neves, and Paulo Verissimo, "From Consensus to Atomic Broadcast: Time-Free Byzantine-Resistant Protocols without Signatures", *The Computer Journal*, Jan. 2006, vol. 49, Issue 1, pp. 82-96.

Alfons Geser and Paul S. Miner, "A New On-Line Diagnosis Protocol for the SPIDER Family of Byzantine Fault Tolerant Architectures", NASA Langley Research Center, Dec. 2004, pp. 1-27.

Li Gong, Patrick Lincoln and John Rushby, "Byzantine Agreement with Authentication: Observations and Applications in Tolerating Hybrid and Link Faults", *Dependable Computing for Critical Applications-5*, Sep. 1995, vol. 10, pp. 139-157.

Leslie Lamport, Robert Shostak and Marshall Pease, "The Byzantine Generals Problem", *ACM Transactions on Programming Languages and Systems*, Jul. 1982 vol. 4, Issue 3, pp. 382-401.

John Rushby, "A Comparison of Bus Architectures for Safety-Critical Embedded Systems", NASA Langley Research Center, Sep. 2001, pp. 1-59.

Extended European Search Report, European Application No. 21789505. 1, 7 pages, May 7, 2024.

Philip Koopman and Michael Wagner, "Challenges in Autonomous Vehicle Testing and Validation", *SAE International Journal of Transportation Safety*, Apr. 14, 2016, vol. 4, Issue 1, pp. 15-24.

Paulo Esteves Veríssimo, Nuno Ferreria Neves and Miguel Pupo Correia, "Intrusion-Tolerant Architectures: Concepts and Design", *Architecting Dependable Systems*, Apr. 2003, vol. 2677, pp. 3-36.

\* cited by examiner

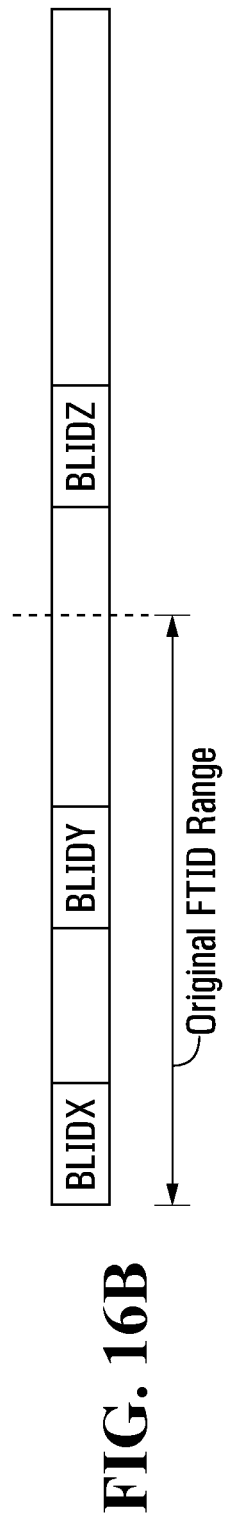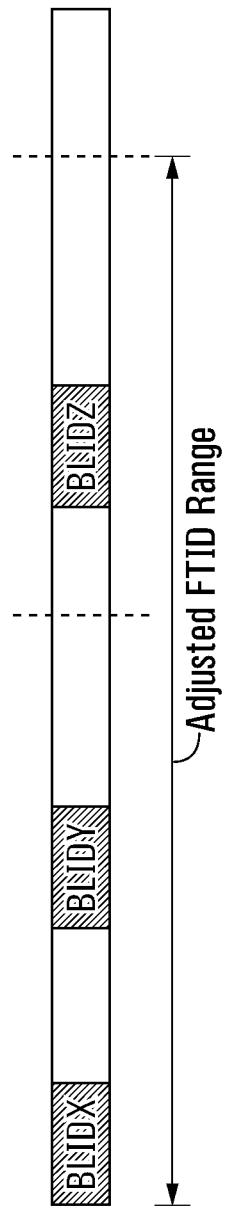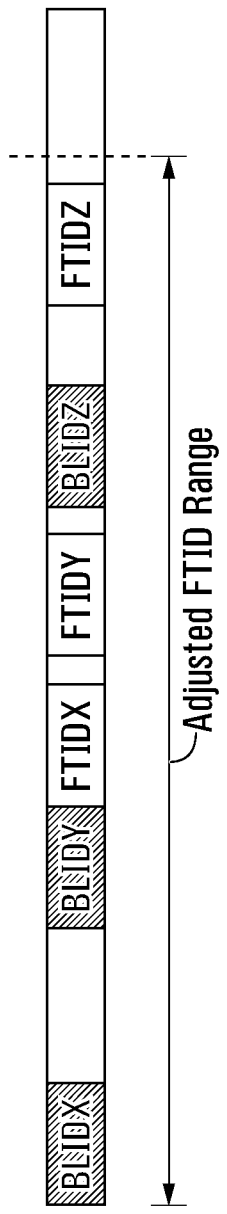
FIG. 16A  FIG. 16B  FIG. 16C  FIG. 16D

FAULT TOLERANT DISTRIBUTED COMPUTING

CROSS REFERENCE TO RELATED APPLICATIONS

This is the U.S. National Stage of International Application No. PCT/CA2021/050509, filed Apr. 15, 2021, which was published in English under PCT Article 21(2), which in turn claims the benefit of U.S. Provisional Application No. 63/010,433, filed Apr. 15, 2020.

TECHNICAL FIELD

The present disclosure is directed at methods, systems, and techniques for fault tolerant distributed computing.

BACKGROUND

Fault tolerance has traditionally been used as a safety application to ensure the continued operation of a system in the event of a failure. A fault tolerant system improves dependability by providing continued service even when a component of the system becomes faulty. The basic method used to achieve this is to incorporate additional components beyond what the system would require in a fault-free environment.

There are a few ways to achieve fault tolerance by adding components. For example, a system which leaves extra components inactive until a fault is detected is said to be using redundancy. Conversely, a system which has additional active components is said to use replication.

Not all literature maintains the above distinction. Replication is the focus herein even As used herein, In the following sections, replication is of interest, even if the literature terms it redundancy.

The following references are incorporated herein by reference:

[Avi04] Algirdas Avižienis, Jean-Claude Laprie, Brian Randell, and Carl Landwehr, "Basic concepts and taxonomy of dependable and secure computing", *IEEE Transactions on Dependable and Secure Computing*, October 2004, Vol. 1, Issue 1, pp. 11-33.

[Cor05] Miguel Correia, Nuno Ferreira Neves, and Paulo Verissimo, "From Consensus to Atomic Broadcast: Time-Free Byzantine-Resistant Protocols without Signatures", *The Computer Journal*, January 2006, Vol. 49, Issue 1, pp. 82-96.

[Ges04] Alfons Geser and Paul S. Miner, "A New On-Line Diagnosis Protocol for the SPIDER Family of Byzantine Fault Tolerant Architectures", NASA Langley Research Center, December 2004, pp. 1-27.

[Gon95] Li Gong, Patrick Lincoln and John Rushby, "Byzantine Agreement with Authentication: Observations and Applications in Tolerating Hybrid and Link Faults", *Dependable Computing for Critical Applications*-5, September 1995, Vol. 10, pp. 139-157.

[Koo16] Philip Koopman and Michael Wagner, "Challenges in Autonomous Vehicle Testing and Validation", *SAE International Journal of Transportation Safety*, 2016, Vol. 4, Issue 1, pp. 15-24.

[Lam82] Leslie Lamport, Robert Shostak and Marshall Pease, "The Byzantine Generals Problem", *ACM Transactions on Programming Languages and Systems*, July 1982 Vol. 4, Issue 3, pp. 382-401.

[Rus01] John Rushby, "A Comparison of Bus Architectures for Safety-Critical Embedded Systems", NASA Langley Research Center, September 2001, pp. 1-59.

[Ver03] Paulo Esteves Veríssimo, Nuno Ferreria Neves and Miguel Pupo Correia, "Intrusion-Tolerant Architectures: Concepts and Design", *Architecting Dependable Systems*, 2003, Vol. 2677, pp. 3-36.

There are multiple, and sometimes competing, fault classification systems. [Avi04] provides a well-reasoned, in-depth taxonomy. However, [Ges04] has three simple categories of fault classification which can be used herein:

1. Firstly, a benign faulty node either generates no output (is silent) or produces output directly detectable as faulty.
2. Secondly, a symmetric faulty node generates arbitrary faulty output which is received identically by all receivers.
3. Thirdly, an arbitrary and asymmetric, Byzantine faulty node generates arbitrary faulty output not necessarily received identically by different receivers.

There are a few interesting scenarios that can cause an asymmetric fault. One as described in [Rus01] concerns slightly off specifications (SoS) faults. For example, a digital output intended as a logical one may violate voltage specifications by being too close to the threshold between a logical one and logical zero. The result may be that some receivers capture a logical one while others capture a logical zero, hence establishing an asymmetrical fault.

The byzantine fault can also be seen in a cyber-security context [Gon95], [Ver03]. In this case, adversarial intrusion may succeed in compromising a component and thereby cause a byzantine fault.

In an embedded system utilizing distributed computing, the bus facilitating communication between nodes is essential.

Redundant components can be used to overcome fault, but only if the fault is detectable such that the activation of the redundant component can be triggered. As such, a redundant design seems to address mainly benign faults. However, [Koo16] shows the idea that the use of suitably capable monitoring, as can be seen in FIG. 1, can be used to convert faults into benign ones.

[Koo16] refers to this set up as heterogeneous redundancy because two dissimilar components are reading the same inputs. Because this system merely converts other faults to benign faults, additional redundancy is required to obtain uninterrupted service.

Inherent in systems with replication is that multiple components are "live"—they are simultaneously producing output. This type of design must implement some method of output selection. If the replicated component were electro-mechanical, such as a power supply, there would be an electromechanical method of controlling or combining the influence of the components. In an information system, such as a distributed cyber physical system, the parallel would be that of selecting valid information in case of disagreement between replicated components.

Terms used to describe this problem are the consensus problem and Byzantine agreement.

In a distributed system, asymmetric faults can give rise to the consensus problem. In some papers the term Byzantine agreement is used.

[Lam82] cites a ballistic missile defense system using redundant computing sites to protect against the destruction of individual sites. The authors articulate this problem and propose an algorithmic solution. The authors also lay out the interactive consistency conditions which are the conditions required for achieving agreement.

The work uses as an example backdrop the Byzantine generals, and hence the term Byzantine agreement. However, in the context of distributed computers, the actor considered is a networked computing node, rather than the historical figure of a military officer. Also, in this source, the decision requiring consensus is a binary choice, attack or retreat. In an automotive system, such a choice might be whether or not to apply a particular braking force at one wheel.

Based on [Lam82], the consensus problem emerges when a faulty or compromised node is able to influence the decision asymmetrically. For example, an asymmetric voting behavior of a compromised general (traitor) between two loyal generals would be to send a retreat vote to one general and an attack vote to the other. Clearly in this case, consensus would be broken since one division would attack and the other retreat.

[Cor05] explores the idea that the consensus problem is a manifestation of the atomic broadcast problem. They suggest, if atomic broadcast is provided, then Byzantine agreement is trivially achievable. Conversely, a Byzantine agreement algorithm can be used to implement atomic broadcast.

If a particular bus implementation utilizes an inherently broadcast medium, and if this broadcast medium meets ordering conditions, it would follow that the bus is inherently consensus-forming. [Lam82] teaches consensus algorithms in the oral messaging model, which builds in the condition that the identity of a sender is irrefutable at the immediate message receiver. For atomic broadcast to form Byzantine agreement, a broadcast medium will provide a form of authenticity assurance.

SUMMARY

According to a first aspect, there is provided a method comprising: generating at least three fault tolerant messages for sending along at least one communication channel, wherein the generating comprises: obtaining a first initial message identifier; mapping the initial message identifier to at least three different fault tolerant identifiers; and using the at least three different fault tolerant identifiers to identify the at least three fault tolerant messages; and transmitting the at least three fault tolerant messages along the at least one communication channel.

The at least three different fault tolerant identifiers may be selected from a first range of a fault tolerant identifier space.

The first range may only provide fault tolerant identifiers that are mapped to the first initial message identifier.

The at least three fault tolerant identifiers may be randomly selected from the first range of the fault tolerant identifier space.

Fault tolerant identifiers corresponding to a second initial message identifier may be selected from a second range of the fault tolerant identifier space that follows the first range.

The first and second ranges may be exclusive of each other.

The second range may immediately follow the first range in the fault tolerant identifier space.

Fault tolerant identifiers corresponding to a second initial message identifier may be selected from a second range of the fault tolerant identifier space that follows the first range; the fault tolerant identifiers corresponding to the first and second ranges may be respectively randomly selected from the first and second ranges; and the first and second ranges may span differently sized portions of the fault tolerant identifier space.

The generating of the at least three fault tolerant messages may further comprise: generating data from multiple data sources; and respectively assigning the data from the multiple data sources to be payloads of the at least three fault tolerant messages.

The number of the data sources may be identical to the number of the fault tolerant messages.

The at least one communication channel may be communicative with computing nodes and the generating and the transmitting may be performed by at least one of the computing nodes, and the method may further comprise: respectively receiving at least two authority change messages from at least two of the computing nodes within a predetermined amount of time, wherein the authority change messages identify a compromised one of the data sources; and disregarding the data sent by the compromised one of the data sources.

The data sources may comprise different processes executing on a computing node.

The data sources may comprise different computing nodes.

The method may further comprise re-assigning a computing task from the compromised one of the data sources to another one of the data sources.

The at least one communication channel may be communicative with computing nodes and the generating and the transmitting may be performed by at least one of the computing nodes, and the method may further comprise: performing a synchronization between the computing nodes; and based upon the synchronization between the computing nodes resulting from the synchronizing, generating a new set of fault tolerant identifiers.

The generating of the new set of fault tolerant identifiers may comprise: combining a synchronization seed resulting from the synchronization with a communal key shared between the computing nodes to provide a random number generator seed; and generating the new set of fault tolerant identifiers using the random number generator seed.

The synchronization may be a time synchronization between the computing nodes, and the synchronization seed may be a time stamp shared by the computing nodes resulting from the synchronization.

The method may further comprise, following the synchronization, re-assigning computing tasks between the computing nodes.

The at least three different fault tolerant identifiers may be selected from a first range of a fault tolerant identifier space, and the new set of fault identifiers may be selected from a second range of the fault tolerant identifier space that spans a differently sized portion of the fault tolerant identifier space than the first range.

The at least one communication channel may comprise at least two communication channels, and the at least three fault tolerant messages may be redundantly transmitted along the at least two communication channels.

The at least one communication channel may comprise at least two communication channels and transmission of the at least three fault tolerant messages may be divided between the at least two communication channels.

The method may further comprise: receiving the at least three fault tolerant messages from the at least one communication channel; and determining that the fault tolerant identifiers of the at least three fault tolerant messages comprise part of an approved set of fault tolerant identifiers.

The method may further comprise: determining the initial message identifier from the at least three different fault tolerant identifiers; determining that the data contained in respective payloads of at least a majority of the at least three fault tolerant messages are within a predetermined range of each other; determining data to be relayed to a consuming application based on the data contained in the respective payloads of the majority of the at least three fault tolerant messages that are within the predetermined range of each other; and forwarding the data to be relayed to the consuming application to the consuming application.

According to another aspect, there is provided a method comprising: receiving a fault tolerant message from at least one communication channel, wherein the fault tolerant message comprises a fault tolerant identifier; detecting a fault with the fault tolerant message; and performing an action in response to the detecting of the fault.

The detecting of the fault may comprise determining that the fault tolerant identifier does not map to a fault tolerant identifier space from which valid fault tolerant identifiers are selected.

The method may further comprise receiving another fault tolerant message from the at least one communication channel, the other fault tolerant message may comprise another fault tolerant identifier, and the detecting of the fault may comprise: determining an initial message identifier mapped to the fault tolerant identifiers; and determining that the fault tolerant identifiers are identical to each other.

The method may further comprise receiving another fault tolerant message from the at least one communication channel, the other fault tolerant message may comprise another fault tolerant identifier, and the detecting of the fault may comprise determining that data comprising respective payloads of the fault tolerant messages are outside a predetermined range of each other.

The action performed in response to the detecting of the fault may comprise sending an authority change message identifying a data source of the data corresponding to the fault.

The action performed in response to the detecting of the fault may comprise blacklisting the fault tolerant identifier.

The at least one communication channel for any of the above aspects may comprise a Controller Area Network bus and the initial message identifier may be a Controller Area Network identifier. Additionally or alternatively, the at least one communication channel may comprise an Ethernet cable. Additionally or alternatively, the at least one communication channel may comprise a wireless communication channel.

According to another aspect, there is provided a non-transitory computer readable medium having stored thereon computer program code that is executable by a processor and that, when executed by the processor, causes the processor to perform the method of any of the foregoing aspects or suitable combinations thereof.

According to another aspect, there is provided a system comprising multiple computing nodes communicatively coupled to each other, wherein the multiple computing nodes are configured to collectively perform the method of any of the foregoing aspects of the method or suitable combinations thereof. The computing nodes may comprise a processor and a non-transitory computer readable medium having stored thereon processor-executable computer program code that, when executed, causes the at computing nodes to perform the foregoing aspects of the method or suitable combinations thereof. Additionally or alternatively, the computing nodes may implement the foregoing aspects of the method in hardware, such as by using an application specific integrated circuit.

The system may further comprise at least one bus via which the computing nodes are communicatively coupled to each other.

The at least one bus may comprise a Controller Area Network bus and the initial message identifier may be a Controller Area Network identifier.

The at least one bus may comprise an Ethernet cable.

The computing nodes may wirelessly communicate with each other.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments:

FIGS. 16A-D are block diagrams depicting an example process of generating FTIDs with a blacklist.

DETAILED DESCRIPTION

Traditional approaches to cyber-security have been based on anomaly detection systems built upon machine learning or deep learning. These systems generate many false positives and negatives and thus present a major limitation for the use of mission critical real-time applications such as the modern vehicle. A method of using fault tolerance as a way to circumvent cyber-attacks in a distributed computing environment is described herein.

Figure 1:
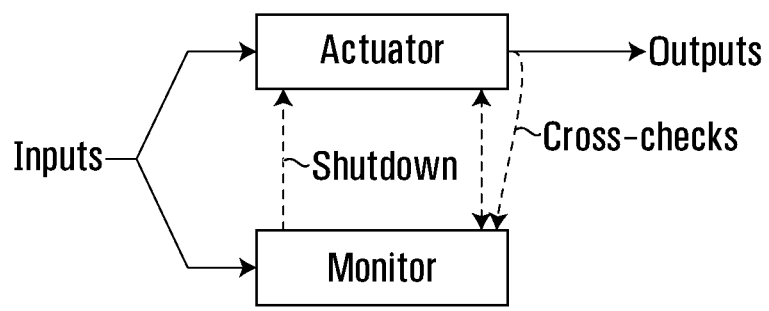
FIG. 1 (PRIOR ART) is a block diagram depicting the conversion of faults into benign faults.
Figure 2:
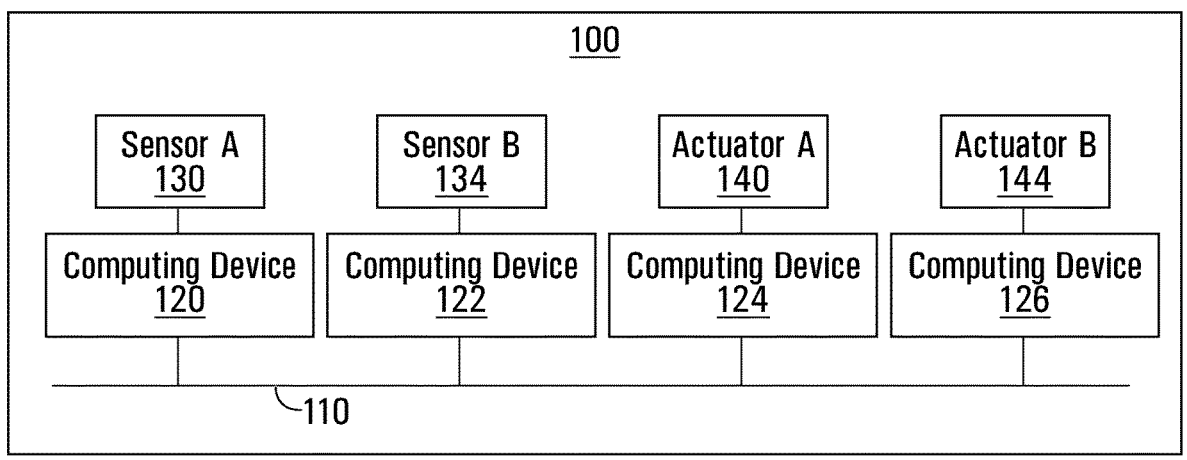
FIG. 2 is a block diagram depicting an example system for detecting faults in internal components.

By the nature of a distributed system, data of value moves around the system traversing component boundaries. Therefore, faults affecting valuable data will propagate to the component boundaries. FIG. 2 is block diagram depicting an example system for detecting faults in internal components. Two sensors, Sensors A and B 130, 134, and two actuators, Actuators A and B 140, 144, are respectively communicatively coupled to first through fourth computing devices 120, 122, 124, 126. All of the computing devices 120, 122, 124, 126 are communicatively coupled to a network bus 110. In essence, if a memory location inside the first computing device 120 as depicted in FIG. 2 is damaged, then when that memory location is used directly or indirectly, the results are propagated to the network bus 110 as the computing device 120 has only one outgoing external interface. Internal faults will propagate to an external interface if the function has value to a system. In a vehicle a Controller Area Network (CAN) bus is a common interface for computing devices and is used to communicate data between computing devices on the network. In a cyber-attack it is common to attack the network bus to manipulate data traffic along this communication media to create adverse results.

An intrusion tolerant solution to cyber-attacks of the system based on Fault Tolerant Distributed Computing (FTDC) is described. As described further below, methods, systems, and techniques described herein comprise generating at least three fault tolerant messages for sending along at least one communication channel, and transmitting those at least three fault tolerant messages along the at least one communication channel. Generating the fault tolerant messages comprises obtaining a first initial message identifier; mapping the initial message identifier to at least three different fault tolerant identifiers; and using the at least three different fault tolerant identifiers to identify the at least three fault tolerant messages. The fault tolerant identifiers are referred to as "FTIDs" herein. In at least some examples, and as described further below, the at least one communication channel may comprise a physical bus, such as a CAN bus; the first initial message identifier may comprise a CAN identifier ("CANID") used with native messages on the CAN bus; and fault tolerant messages are those messages whose identifier fields comprise the FTIDs. More particularly, in at least some embodiments each FTID is used as a virtual identifier that permits fault tolerant communication on the CAN bus with real-time detection and correction that provides self-healing of the network and is resilient to internal faults and external attacks. Additionally or alternatively, the at least one communication channel may comprise a wireless communication channel, such as a Wi-Fi™ signal or another wireless network protocol based on the IEEE 802.11 family of standards. As another example, the at least one communication channel may comprise wired and wireless channels (e.g., the at least one communication channel may comprise a wired Ethernet cable and a wireless network).

In the embodiments below, a triple fault tolerant system is described. A person skilled in the art will recognize though that a fault tolerant system is not limited to only two fail-safes (with the second FTID acting as a first fail-safe, and the third FTID acting as a second fail-safe), but can be any number of fail-safes that is greater than two.

A triple fault tolerant system is described on a bus (e.g. CAN, Ethernet). In essence, all data is triplicated on the bus to quickly identify anomalies through a voting process. The data on the bus is generated either by sensors or computation tasks. The data is transmitted using fault tolerant messages respectively identified using FTIDs where each fault tolerant message contains a payload of either a sensor reading (individual or copy) or the results of a computational analysis. Each payload of a fault tolerant message is referred to interchangeably herein as an "FTID payload", and each payload for a native CAN message is referred to interchangeably herein as a "CANID payload". There exist three FTID payloads for each CANID payload. Therefore, there are three instances of each computation task on the network which can be on the same device or separate computing devices to output the task's three FTIDs. To clarify this an example in reference to FIG. 2 is presented. The first computing device 120 has three separate but identical computation tasks A producing results independently of each other. Alternatively, computation task A resides on first through third computing devices 120, 122 and 124. They each produce results and output their payload on the bus 110 with different FTIDs. The fourth computing device 126 receives all data for each of the three FTIDs and compares the results of the payloads of the associated fault tolerant messages. If all three FTID payloads are the same or two out of the three have the same payload then the data is applied to Actuator B 144 attached to the fourth computing device 126. Any payload not matching its peers' payloads implies that it has been manipulated either on the bus 110 or at the source. Each of the computing devices 120, 122, 124, 126 may be responsible for multiple computation tasks and are typically separated by different processes.

Each of the computing devices 120, 122, 124, 126 comprises a processor and a non-transitory computer readable medium, such as random access memory and/or non-volatile storage, communicatively coupled to the processor for data and program storage. More particularly, the medium stores computer program code executable by the processor that, when executed by the processor, causes the processor to perform the methods as described herein. In addition, any one or more of the computing devices 120, 122, 124, 126 may also comprise an interface to Sensors A or B 130, 134 or Actuators A or B 140, 144; display; keyboard; and network interface that permits wireless and/or physical networking in addition to networking using the bus 110.

Figure 3:
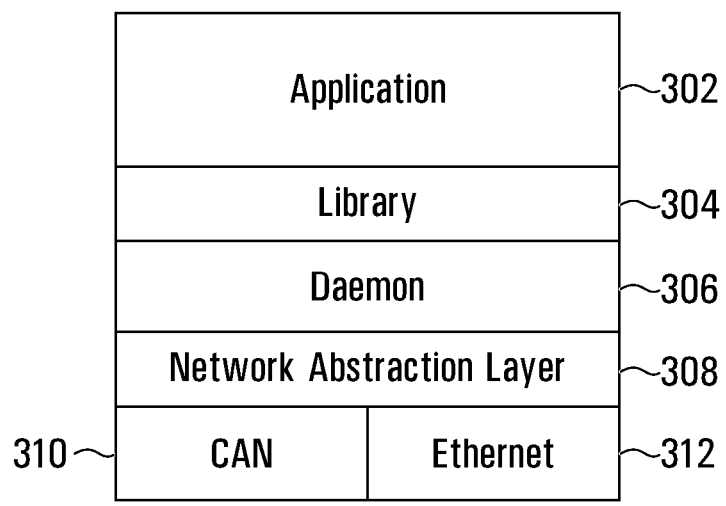
FIG. 3 is a block diagram depicting an example application architecture.

An architecture of an example one of the computing devices 120, 122, 124, 126 in the form of an embedded device is shown in FIG. 3. Similar designs can be implemented for other networks such as Ethernet. The architecture comprises a stack in which a bus such as the CAN bus 310 or Ethernet bus 312 is at the bottom of the stack; a network abstraction layer 308 sits on the bus 310, 312; a daemon 306 sits on the network abstraction layer 308; a library 304 sits on the daemon 306; and an application 302 sits on the library 304. As discussed further below, in at least some example embodiments the functionality described herein is implemented by computer program code used to execute the daemon 306.

In a CAN network all communication is performed using CAN identifiers (each a CANID). The CANID is registered with a Network Data Object (NDO). The library 304, daemon 306, and network abstraction layer 308 are all part of the FTDC and in reference to FIG. 2 reside in the program store of each of the computing devices 120, 122, 124, 126.

Figure 4:
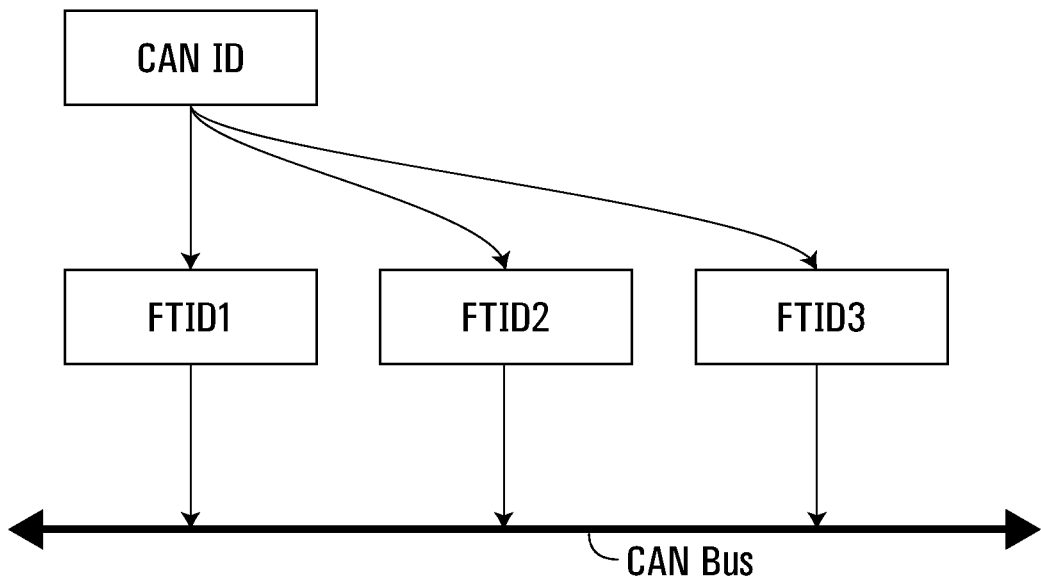
FIG. 4 is a block diagram depicting an example relationship between a CANID and FTIDs.
Figure 5:
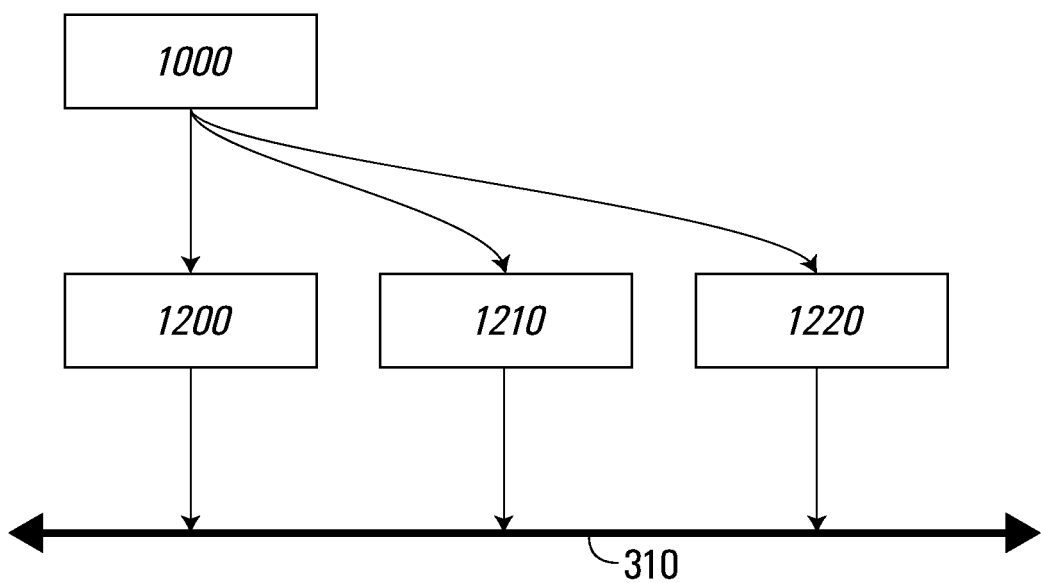
FIG. 5 is a block diagram depicting the example of FIG. 4 with operational values.

The FTID is generated by and resides within the daemon 306. The daemon 306 then communicates it to the appropriate CAN interface. Referring to FIG. 3, the application 302 interacts with the library 304 as it would with the CAN bus 310 in terms of CANIDs; consequently, the application 302 may leverage FTIDs despite only being programmed to use CANIDs. The FTIDs transparently convert the messages for the CAN bus 310 and recreates them on the receiving end to pass them to the consuming applications using CANIDs. This relationship between a CANID and its FTIDs is shown in FIG. 4. FIG. 5 shows example values of the CANID and its FTIDs in operation, in which an example CANID has as value of 1000 and is mapped to three example FTIDs with values of 1200, 1210, and 1220.

In a typical system for example as shown in FIG. 2, a static configuration of CANID is defined for the system. The system configuration lists the CANIDs to be used by the application 302 and a defined range of reserved IDs for the exclusive use of daemon 306 to assign dynamically as FTIDs. The CANID list and the reserved IDs range may overlap. The function of the FTID library is to map an application's CANID to FTIDs that are placed on the CAN bus 310.

The reserved ID range is much larger than the number of CANIDs so as to allow for randomly allocating FTIDs and to create a sparsely populated range. This also gives the system the ability to identify attack attempts on unused IDs.

In a system such as FIG. 2, a node is a control device that connects to the CAN bus 310. Each node runs one instance of the daemon 306. The clients connect to the daemon 306 and in a POSIX environment use a Unix Domain Socket (UDS).

A synchronization mechanism is used to get all the system nodes to agree on a common time. Upon completing a synchronization, the daemon 306 generates a new set of FTIDs for all CANIDs in use in the system. The agreed upon time stamp resulting from the synchronization is used as part of the seed to generate the FTIDs and this ensures that a deterministic set of FTIDs is obtained on all nodes in the system. The process is repeated after each synchronization event.

In CAN networks, CANIDs are inherently ordered by priority with the lower ID having priority over higher IDs that would attempt to write on the bus simultaneously. The FTID system honors the relative priority between the CANIDs.

Going in order of priority, 3 FTIDs are associated with each CANID, randomly distributed over a range of size $$\frac{\text{size of reserved space range}}{\text{num CAN IDs}}.$$

The "reserved space range" is the "fault tolerant identifier space" or "FTID space" over which all FTIDs are distributed. Each range from which a set of FTIDs that correspond to a particular CANID is selected is a range of the FTID space. In at least some embodiments, various ranges of the FTID space may be sequential and non-overlapping; this keeps the relative order of CANIDs via their FTIDs. Each FTID is identified by a pair consisting of the CANID and metadata in the form of an FTID specifier from the set of {FirstFTID, SecondFTID, ThirdFTID}. For each subsequent CANID, in at least some embodiments the FTID range starts right after the last FTID from the previous CANID. This offers a better mixing of the use of FTIDs over time and across synchronization as a specific FTID can end up being used more efficiently. This can be explained by the use of an example. Presume for example that CANID 200, 210 and 220 have payloads that need to be transferred to the CAN bus 310. The FTID space is a reserved space range of 300 to 420. Therefore, by the above formula each CANID corresponds to a range that on average spans of 40 FTIDs. Starting with CANID 200, three random numbers RN1, RN2, RN3 are generated where each number is between 0 and 1.

Then the following is mapped:

CANID 200→FTID1=300+INT(RN1*40)

CANID 200→FTID2=300+INT(RN2*40)

CANID 200→FTID3=300+INT(RN3*40)

Assuming the highest random number generated was for example RN3=0.8, then the max range used is 32. The difference is then added in the range for the next CANID and new random numbers RN1, RN2, RN3 are generated to determine FTIDs 1-3 from a second range of the FTID space corresponding to another CANID, CANID 210. More particularly, the second range starts from 300+32+1=333:

CANID 210→FTID1=333+INT(RN1*(40+8))

CANID 210→FTID2=333+INT(RN2*48)

CANID 210→FTID3=333+INT(RN3*48)

Assume the highest RN is 0.5 then the CANID 220 has a range of 64 (24+40) CANID to select from.

In this example, each of FTIDs 1-3 may be selected from anywhere within the first range of 300 to 332. Consequently, FTID3 may be earlier in that range than FTID1. To ensure sequential ordering of FTIDs 1-3 within that range, instead of multiplying each of RN1, RN2, and RN3 by the full span of that range (40), each of those random numbers may be multiplied by ⅓ of the range's full span or the nearest integer thereto (for that first range, 13).

Similarly the process is repeated when new FTIDs need to be generated and thus the boundary expands and contracts over time for each CANID/FTID group.

Figure 6:
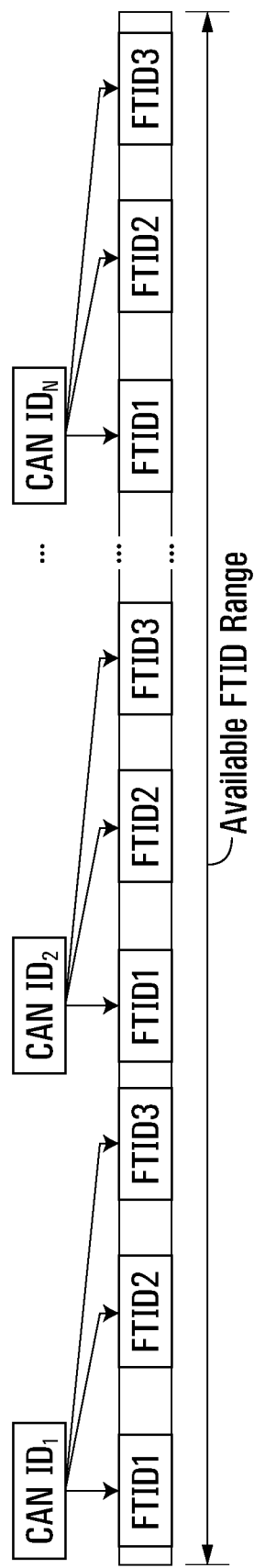
FIG. 6 is a block diagram depicting an example association of CANIDs to FTIDs within the FTID reserved space.

FIG. 6 shows a visualization of the association of all CANIDs to their FTID within the FTID space.

Figure 7:
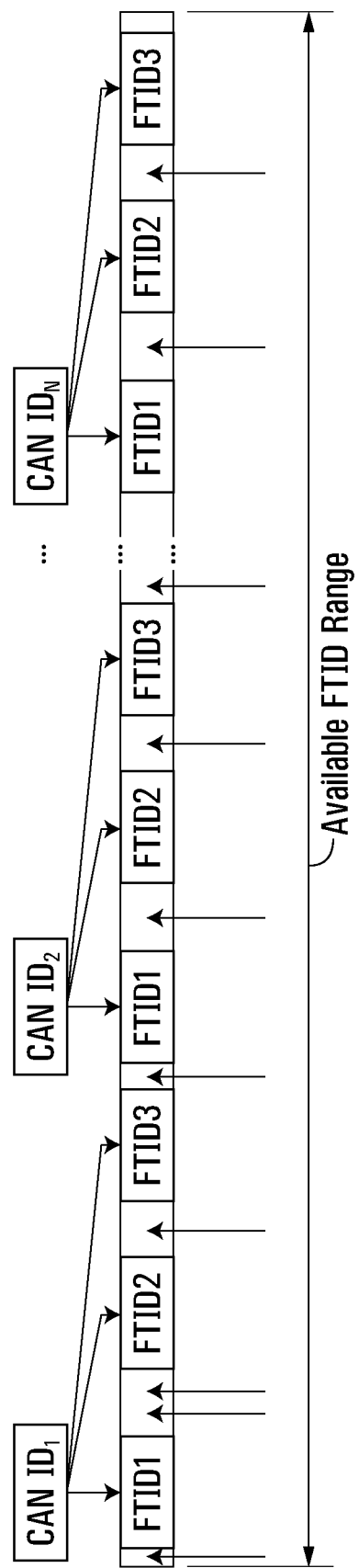
FIG. 7 is a block diagram depicting the injections in the inactive FTID reserved spaces that are depicted in the example of FIG. 6.

From the sparse use of the FTID reserved space, unauthorized injections can be detected within the reserved space that do not target active FTIDs from would be attackers as depicted in FIG. 7. In some examples, this is the case when an attacker is simply experimenting to try to figure out and learn how the system behaves and functions.

Above is a particular way of generating the FTIDs but in no way an exhaustive enumeration and many more variations can be produced by someone skilled in the art.

In any system there are three major functions: namely source, computation and consumer functions. A typical source is a sensor, such as Sensors A and B 130, 134. Speed, angular position, switch position, voltage, resistance and optical sensing (e.g. video) are a few examples. An example computation task is to calculate a wheel angle based on various sources of data. A consumer is typically an endpoint that acts on the data. For example, a consumer may display the results of computation task on an LCD display or apply the calculated wheel angle to an actuator, such as Actuators A and B 140, 144.

Figures 8A, 8B:
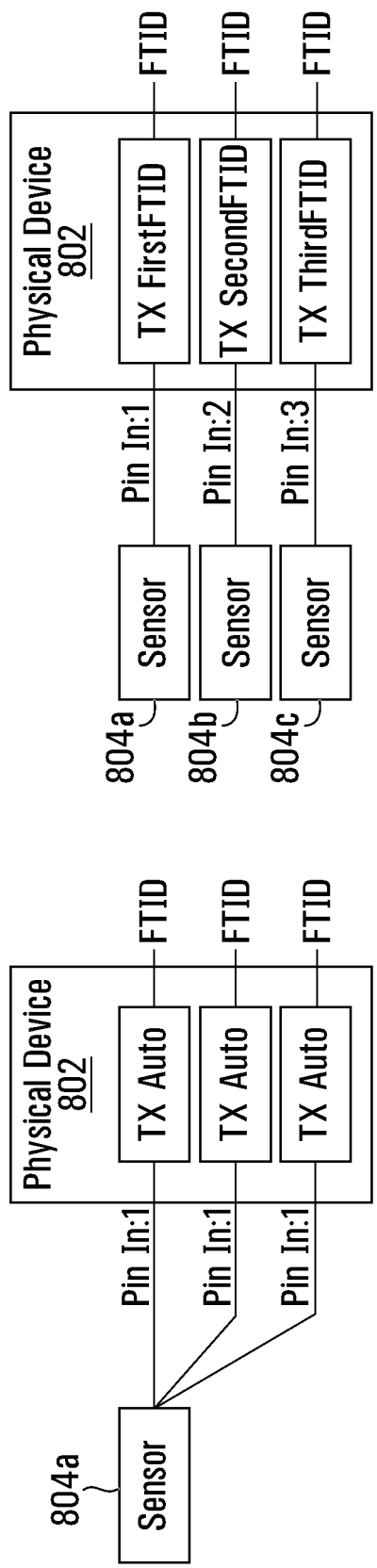
FIGS. 8A and 8B are block diagrams depicting example sensor configurations to work with FTIDs.

Computation tasks generate input data on the bus 310; sensors when acting as sources also generate input data on the bus 310. In fault tolerant environments, depending on the application's 302 specifications, there may be a single sensor or multiple sensor readings for a single environment or task (e.g. speed of a vehicle). In one embodiment where there is a single sensor fault tolerant environment, sensor data may be read by different processes, or may be read from a single process, where copies can be made. In an alternate embodiment, where there is a multi-sensor environment, each of the sensors may have their own processes, or a single process can access all sensors. FIG. 8A shows a single sensor 804*a* with processes within a physical device 802 reading and transmitting data on the CAN bus at regular intervals. Three copies are read and placed on the bus as different FTIDs, each output from its own TX Auto process, that correspond to a single CANID. FIG. 8B shows three separate sensors 804*a-c* for the same environment being read and placed on the bus as three different FTIDs by virtue of three respective processes TX FirstFTID, TX SecondFTID, and TX ThirdFTID running within the physical device 802.

As an example, for a given sensor that publishes a value on the CAN bus 310, it will post the messages with the associated FTIDs for its CANID. There are two distinct possibilities: there can be one physical sensor and its value is output in three copies on the bus 310, one for each FTID (FIG. 8A); and in the other configuration there are three independent sensors measuring the same environment that each publishes its value to the bus under a different FTID (FIG. 8B).

Figure 9:
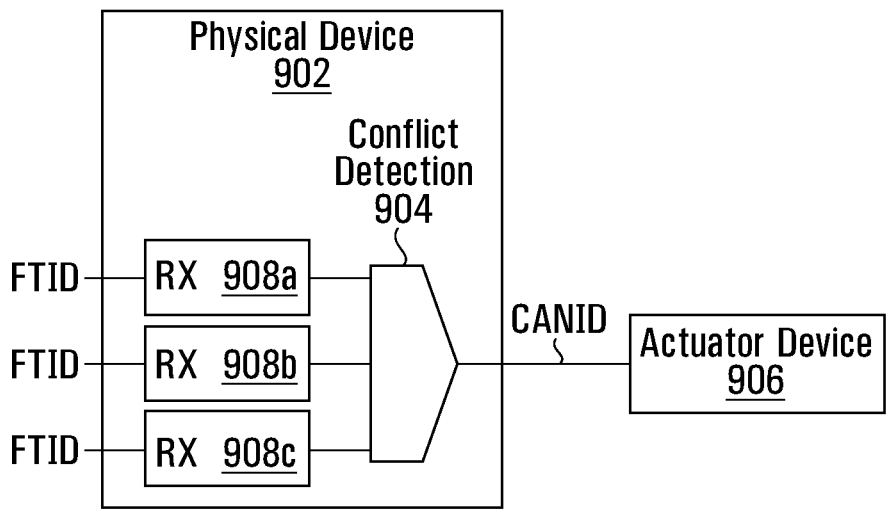
FIG. 9 is a block diagram depicting an example of FTID reconciliation for an actuator device.

On the receiving side the daemon 306 in at least some embodiments, upon receiving an FTID, reconverts it to the appropriate pair of CANID and FTID specifier; that is, the daemon 306 converts the FTID to its corresponding CANID. This is used to ensure that all three FTIDs for a CANID are received and then the payloads are reconciled into one validated and corrected payload for the CANID before it is provided to the consuming application or applications. FIG. 9 is a depiction of the receiving process for an actuator device 906. Essentially three FTIDs are received for each CANID using three RX processes 908*a-c* within a physical device 902 and a voting system is applied to the data at a conflict detection module 904 to determine the correct data has been received and to discard any anomalies. Referring again to FIG. 9, three different FTIDs are received and are processed by the conflict detection module 904 to ensure that all the received payloads are all equal or within a set tolerance. Then the FTIDs are converted to the CANID and passed on to the actuator device 906 to be applied. An example is a wheel angle transmitted using three fault tolerant messages respectively identified by the three FTIDs of FIG. 9 to be used to a motor connected to a vehicle wheel.

The use of FTIDs is also generalized and applied to the output from computation tasks. Computation task outputs are typically put back on the bus 310 on the way to the actuator as input.

In general, a computation task has an input and an output. In at least some embodiments, computation devices do not have any input and thus may be hardcoded to produce output at a regular interval. In the depicted embodiment, computation tasks take inputs and produce outputs; more particularly, the input payload is used by the computation task to produce an output. Computation tasks that take input and that do not take input are treated the same way in terms of the outputs they produce.

Computation tasks on at least three different nodes are run from the inputs consolidated and validated through the conflict detection module 904. Each of the three computation tasks for an output CANID message is assigned an FTID specifier. Along with the CANID for its output, this FTID specifier allows the daemon 306 to determine the FTID to use to send the output and thus it is ensured that there are three versions of the output on the bus 310 to be retrieved and consolidated at the consumer site.

Figure 10:
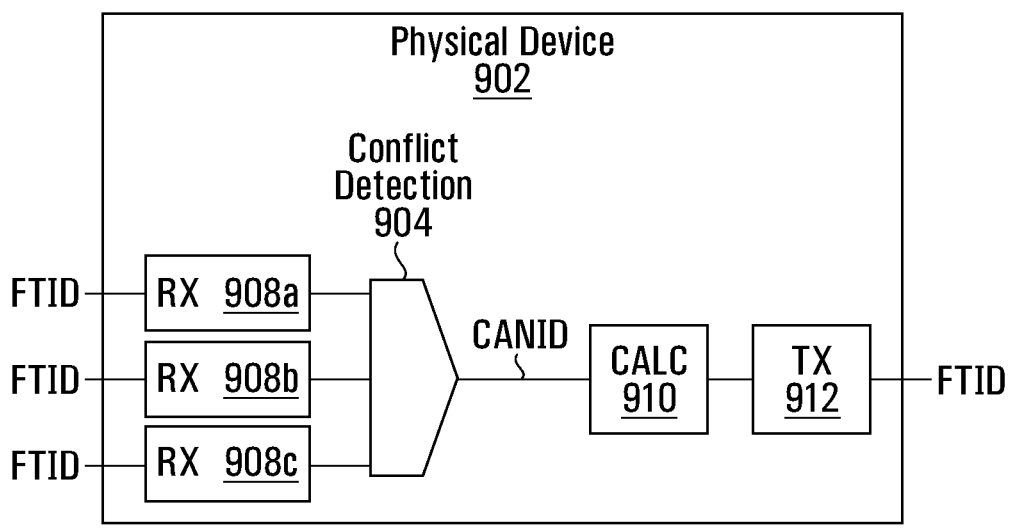
FIG. 10 is a block diagram depicting an example computation task from reception of FTIDs to the output of another FTID.
Figure 11:
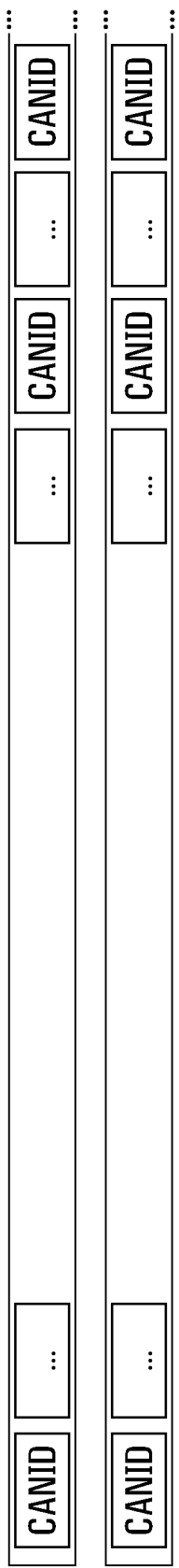
FIG. 11 is a block diagram depicting example CAN messages duplicated on different buses.

The calculation of one such computation task to produce the output for a particular FTID is shown in FIG. 10. In FIG. 10, three different FTIDs are received by the RX processes 908*a-c* running in the physical device 902; any conflicts are resolved by the conflict detection module 904 and the module 904 outputs the consolidated or validated payload corresponding to the CANID mapped to the FTIDs; that payload is processed by calculation and TX modules 910 and 912, which output a new FTID. Multiple physical devices 902 running in parallel may accordingly generate multiple new FTIDs in parallel, with in at least some embodiments the multiple new FTIDs all corresponding to the same CANID. In at least some embodiments, the calculation and TX modules 910, 912 may also use data corresponding to one or more other CANIDs in addition to the CANID mapped to the FTIDs depicted in FIG. 10 and mentioned above.

Having the ability to distribute computation tasks on separate nodes, it is possible to assign which node is to run a specified computation task. This assignment may be static, but a more useful and flexible option is to dynamically determine which node is to run each computation task. The initial distribution of tasks is done in a way to balance the CPU load among the system nodes and to take into consideration the specific characteristics of each available node such as processing power, available memory and storage. Then as the system operation goes on, the ability to reassign tasks to different nodes is reserved.

This is useful in cases such as a node is determined to constantly provide output values that conflict with other task outputs. In such a case the node will be determined to be compromised and all its tasks may be reassigned to other nodes to re-establish the trust in all computation tasks. A task may also be reassigned in case its node is not providing results for it in time. In some examples this is caused by the host node being down, overwhelmed and unable to process the task in a timely fashion or the node having been compromised by an attacker.

This can be best explained by the following example: presume three tasks T1, T2, T3 that need to be performed. In reference to FIG. 2, each of the computing devices 120, 122, 124, 126 can execute tasks T1, T2, and T3. Assume initially that task T1 is assigned to computing devices (CD) 120, 122, and 124; Task T2 is assigned to CDs 122, 124, and 126; and Task T3 is assigned to CDs 124, 126, and 120. Therefore:

CD 120 is responsible for T1 and T3.
CD 122 is responsible for T1 and T2.
CD 124 is responsible for T1, T2 and T3.
CD 126 is responsible for T2 and T3.

Remember that each task instance (e.g. T1) has a unique FTID specifier associated with it based on the device it executes on. For example, T1 on CD120 may have FirstFTID, and T1 on CD122 may have SecondFTID, and T1 on CD124 may have ThirdFTID.

Now assume CD 120 is compromised. Then all the tasks on CD 120 are reassigned to CD 122 and CD 126. CD 120 was responsible for T1 and T3. In this case T1 will henceforth be executed by CD 126 and T3 by CD 122.

To remove a device from a position of authority, in at least some embodiments at least two other devices have to successfully initiate an authority change message. Devices on the network monitor the authority message ID range for the authority change message. For example CD 122 will send a message on a specific ID and CD 124 will send the message on another specific ID. The message identifies the compromised device so all nodes know that it has its authority removed and shall not be responsible for computation tasks going forward. These messages have to be sent within a specified time limit of each other; otherwise they are resent. All devices on the network understand the message range and process the message in a deterministic manner.

Following an FTID shuffle, if one of the computation tasks doesn't follow the change and keeps using its previous FTID, that computation task and its CD are deemed compromised. The particular CD 120, 122, 124, 126 has its authority removed per the process described above.

In the scenario where an attacker targets the FTID of a computation task, this fault is recognized by the system as a duplicate FTID use and leads to blacklisting of the FTID and the FTIDs are consequently shuffled so as to move away from using the FTID under attack.

If CD 120 changes its FTID but still produces bad results consistently then again it is taken out of a position of authority.

In at least some embodiments, separate CAN buses 310 may also be added. In the depicted embodiments up to three CAN buses 310 may be added; however more may be added in other embodiments.

The current state of the art in the industry is to use duplicate buses as replication method of the messages on different buses to create redundancy as shown below. Therefore, in the event that one bus fails the other is available with the same data, duplicated, available to the application 302.

Figure 12:
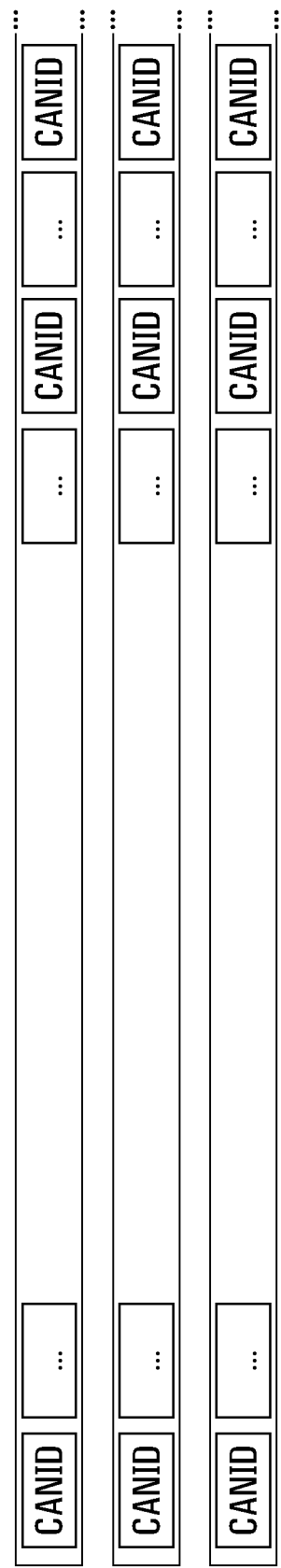
FIG. 12 is a block diagram depicting an example triple CAN bus with CANIDs distributed across all buses.

Similarly, a triple CAN bus 310 can also be implemented as shown in FIG. 12 so that in a cyber-attack at least two buses 310 would need to be compromised in order for ambiguity to exist and prevent identifying which buses 310 have been compromised. However, it should be noted that once a CANID is identified on the bus for an attack by a malevolent intruder it is a trivial task to attack all three buses simultaneously with the same CANID.

An example triple bus model with FTID implementation is as follows. There exist three copies of the data on a single one of the buses 310; for example this can be reading sensor data by three different processes. The processes can reside on different CPU or a single CPU. In a triple bus implementation FTIDs are distributed across different buses 310. This approach of added buses 310 reduces the load on a single bus 310 from the use of FTIDs on a single bus implementation.

Figure 13:
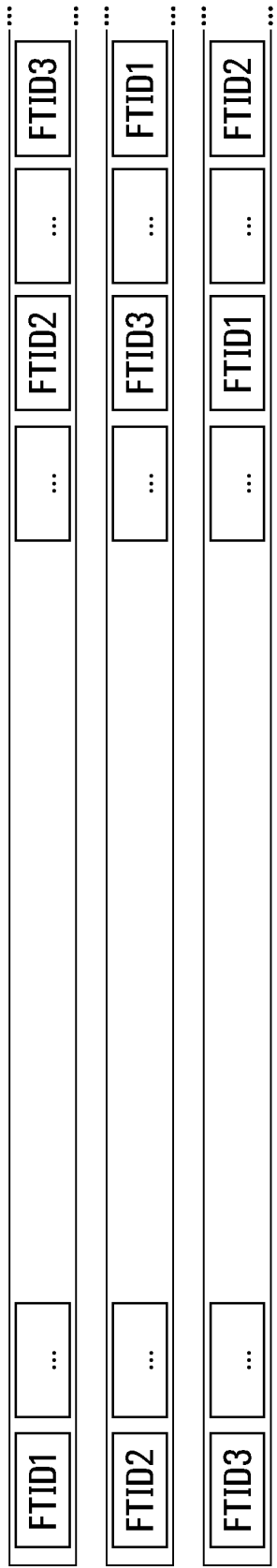
FIG. 13 is a block diagram depicting the example triple CAN bus of FIG. 12 with FTIDs on each bus and a dynamic bus order.

There are many different ways that a triple bus can be implemented. One is to duplicate all data but a better implementation is to distribute the data on different buses 310 and dynamically change the bus order as shown in FIG. 13.

With the use of a triple bus and different FTIDs, the fault tolerant messages can now be distributed over three separate buses 310: one per bus for each CANID triplet. This adds fault tolerance to the physical bus itself as if one of them fails, then the system can still go on with the remaining two buses and distribute the FTIDs over the two remaining buses.

Figure 14:
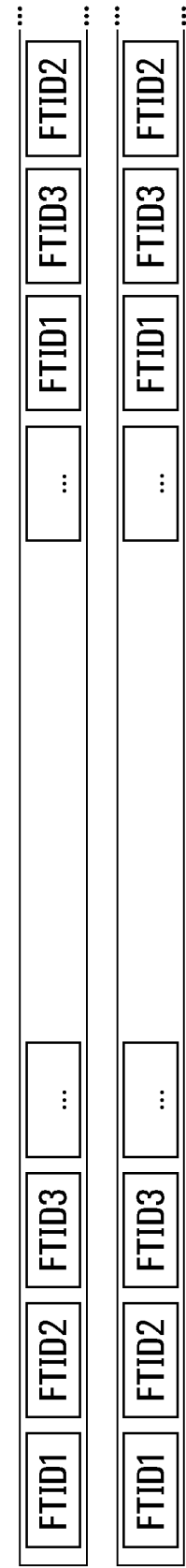
FIG. 14 is a block diagram depicting an example single bus solution on a dual bus.

In the event of an attack on a triple bus, in some examples the system reverts to a two bus or single bus solution. There are many options and one is to duplicate the single bus solution on both remaining buses as shown in FIG. 14.

Alternatively, if bandwidth is at a premium then a deterministic method is used to distribute the FTIDs dynamically on each bus.

A two-bus solution is a viable alternative to a three-bus solution and may be more cost effective for avionics and vehicles as the extra cabling weight may be undesirable.

Figure 15:
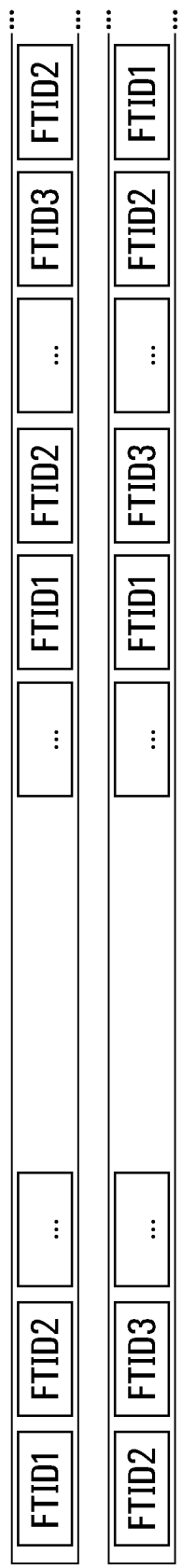
FIG. 15 is a block diagram depicting an example dual bus solution distributing FTIDs dynamically across the buses.

Referring to FIG. 15, if a single bus is attacked then the other bus can continue functioning as there are at least two FTID on each bus. If an attack is successful on a dual bus then a single bus model is dynamically adopted.

With multiple buses, attacks that take place on only one bus can be detected. The bus is kept running but all FTID communications are moved to the other buses, thereby keeping the attacker at bay and resuming operations as would be the case had the bus failed.

To keep the attacker busy, the attacked bus may be kept running and busy with random messages unrelated to operations.

In order to provide resilience for the FTID mechanism, FTIDs are in at least some embodiments dynamically (i.e. on the fly) shuffled. This adds a layer of resilience by resetting the CANID to FTID associations so that any knowledge gained on the correspondence of an FTID to a particular CANID or behavior by an attacker has to be discarded and rediscovered. Such FTID shuffling can be triggered by different event scenarios. Examples of those event scenarios comprise the periodical time triggered event; the use of thresholds of detected attacks and anomalies; and such events as the nodes in the system determining that they fell out of sync of a communally agreed upon reference time.

The periodical timer triggered shuffle may be implemented by setting a rule for FTID shuffling to be performed periodically every predetermined amount of time. Additionally, the amount of time can be randomized from period to period to make it even more unpredictable.

When any of the nodes in a system determines that it has fallen out of sync with the rest of the nodes it will initiate a synchronization that triggers a FTID regeneration. Alternatively, this can be replaced by a strategy of pre-emptively performing a synchronization and FTID generation at regular or random intervals as described above.

Detected faults and anomalies in the operation of the system are reported and when certain configured thresholds are satisfied an FTID shuffle is triggered. Such faults comprise a reserved space violation, a duplicate FTID reception, the value from an FTID being in clear conflict, and anomalies as reported by the system. Furthermore faults that are attributed to a specific FTID trigger the blacklisting of the FTID for a period of time upon meeting a threshold.

In at least some examples the process to shuffle the FTIDs comprises the following:
1. One node requests a synchronization with the other nodes in the system.
2. The result of the synchronization is that all nodes have a new reference time value.
3. The reference time is combined with a communal key to provide the seed for the random generator used to generate the new FTIDs.
   In some examples, the communal key is a previous seed values. Alternatively, the communal key may be determined from something unrelated for better randomization of the seed.
4. FTIDs are generated as in the original generation with the added following constraint. When determining the ranges of values available for the FTIDs corresponding to one CANID, if the default range includes one or more blacklisted FTIDs, the range is extended by as many blacklisted FTIDs it contains, including any additional blacklisted FTIDs that may become part of the range as it is extended.
5. For the purpose of randomly selecting the FTIDs in the range a random value is generated in the range [0, number of available FTIDs in the range] and the non-blacklisted FTIDs are treated as a contiguous range as if the blacklisted FTIDs were not present. This is discussed further below in respect of FIG. 16.

6. Such a process can also shuffle and reassign the computation tasks to different nodes and FTIDs.

An example of the process of generating new FTIDs while there are blacklisted FTIDs is described in respect of FIGS. 16A-D. In FIGS. 16A-D, blacklisted FTIDs are shown as BLID*. FIG. 16A is the blacklist containing three blacklisted FTIDs. FIG. 16B shows that for the depicted CANID and FTID range, two blacklisted IDs fall within the original FTID range a third of the blacklisted IDs lays beyond the original FTID range.

To keep the FTID range and distribution as intended, the blacklisted IDs become inaccessible and the FTID range is extended by two. Doing so now has the third blacklisted ID become part of the adjusted FTID range and the range is therefore extended by one again and the third FTID is also made inaccessible as can be seen in FIG. 16C.

FIG. 16D shows an example distribution for the new FTIDs is depicted within the adjusted FTID range, which is expanded and permits the new FTIDs to be selected from the adjusted FTID range while avoiding the blacklisted IDs.

The processor used in the foregoing embodiments may comprise, for example, a processing unit (such as a processor, microprocessor, or programmable logic controller) or a microcontroller (which comprises both a processing unit and a non-transitory computer readable medium). Examples of computer readable media that are non-transitory include disc-based media such as CD-ROMs and DVDs, magnetic media such as hard drives and other forms of magnetic disk storage, semiconductor based media such as flash media, random access memory (including DRAM and SRAM), and read only memory. As an alternative to an implementation that relies on processor-executed computer program code, a hardware-based implementation may be used. For example, an application-specific integrated circuit (ASIC), field programmable gate array (FPGA), system-on-a-chip (SoC), or other suitable type of hardware implementation may be used as an alternative to or to supplement an implementation that relies primarily on a processor executing computer program code stored on a computer medium.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise (e.g., a reference in the claims to "a challenge" or "the challenge" does not exclude embodiments in which multiple challenges are used). It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections. The term "and/or" as used herein in conjunction with a list means any one or more items from that list. For example, "A, B, and/or C" means "any one or more of A, B, and C".

It is contemplated that any part of any aspect or embodiment discussed in this specification can be implemented or combined with any part of any other aspect or embodiment discussed in this specification.

The scope of the claims should not be limited by the embodiments set forth in the above examples, but should be given the broadest interpretation consistent with the description as a whole.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A method comprising:
    (a) generating at least three fault tolerant messages for sending along at least one communication channel, wherein the generating comprises:
        (i) obtaining a first initial message identifier;
        (ii) mapping the initial message identifier to at least three different fault tolerant identifiers; and
        (iii) using the at least three different fault tolerant identifiers to identify the at least three fault tolerant messages; and
    (b) transmitting the at least three fault tolerant messages along the at least one communication channel.

2. The method of claim 1, wherein the at least three different fault tolerant identifiers are selected from a first range of a fault tolerant identifier space.

3. The method of claim 2, wherein the first range only provides fault tolerant identifiers that are mapped to the first initial message identifier.

4. The method of claim 2, wherein the at least three fault tolerant identifiers are randomly selected from the first range of the fault tolerant identifier space.

5. The method of claim 2, wherein fault tolerant identifiers corresponding to a second initial message identifier are selected from a second range of the fault tolerant identifier space that follows the first range.

6. The method of claim 5, wherein the first and second ranges are exclusive of each other.

7. The method of claim 5, wherein the second range immediately follows the first range in the fault tolerant identifier space.

8. The method of claim 5, wherein the fault tolerant identifiers corresponding to the first and second ranges are respectively randomly selected from the first and second ranges, and wherein the first and second ranges span differently sized portions of the fault tolerant identifier space.

9. The method of claim 1, wherein the generating of the at least three fault tolerant messages further comprises:
(a) generating data from multiple data sources; and
(b) respectively assigning the data from the multiple data sources to be payloads of the at least three fault tolerant messages.

10. The method of claim 9, wherein the number of the data sources is identical to the number of the fault tolerant messages.

11. The method of claim 9, wherein the at least one communication channel is communicative with computing nodes and wherein the generating and the transmitting is performed by at least one of the computing nodes, and wherein the method further comprises:
(a) respectively receiving at least two authority change messages from at least two of the computing nodes within a predetermined amount of time, wherein the authority change messages identify a compromised one of the data sources; and
(b) disregarding the data sent by the compromised one of the data sources.

12. The method of claim 11, further comprising re-assigning a computing task from the compromised one of the data sources to another one of the data sources.

13. The method of claim 9, wherein the data sources comprise different computing nodes.

14. The method of claim 9, wherein the data sources comprise different processes executing on a computing node.

15. The method of claim 1, wherein the at least one communication channel is communicative with computing nodes and wherein the generating and the transmitting is performed by at least one of the computing nodes, and wherein the method further comprises:
(a) performing a synchronization between the computing nodes; and
(b) based upon the synchronization between the computing nodes resulting from the synchronizing, generating a new set of fault tolerant identifiers.

16. The method of claim 15, wherein the generating of the new set of fault tolerant identifiers comprises:
(a) combining a synchronization seed resulting from the synchronization with a communal key shared between the computing nodes to provide a random number generator seed; and
(b) generating the new set of fault tolerant identifiers using the random number generator seed.

17. The method of claim 16, wherein the synchronization is a time synchronization between the computing nodes, and wherein the synchronization seed is a time stamp shared by the computing nodes resulting from the synchronization.

18. The method of claim 15, further comprising, following the synchronization, re-assigning computing tasks between the computing nodes.

19. The method of claim 15, wherein the at least three different fault tolerant identifiers are selected from a first range of a fault tolerant identifier space, and wherein the new set of fault identifiers is selected from a second range of the fault tolerant identifier space that spans a differently sized portion of the fault tolerant identifier space than the first range.

20. The method of claim 1, wherein the at least one communication channel comprises at least two communication channels, and wherein the at least three fault tolerant messages are redundantly transmitted along the at least two communication channels.

21. The method of claim 1, wherein the at least one communication channel comprises at least two communication channels and wherein transmission of the at least three fault tolerant messages is divided between the at least two communication channels.

22. The method of claim 1, further comprising:
(a) receiving the at least three fault tolerant messages from the at least one communication channel; and
(b) determining that the fault tolerant identifiers of the at least three fault tolerant messages comprise part of an approved set of fault tolerant identifiers.

23. The method of claim 22, further comprising:
(a) determining the initial message identifier from the at least three different fault tolerant identifiers;
(b) determining that the data contained in respective payloads of at least a majority of the at least three fault tolerant messages are within a predetermined range of each other;
(c) determining data to be relayed to a consuming application based on the data contained in the respective payloads of the majority of the at least three fault tolerant messages that are within the predetermined range of each other; and
(d) forwarding the data to be relayed to the consuming application to the consuming application.

24. A non-transitory computer readable medium having stored thereon computer program code that is executable by a processor and that, when executed by the processor, causes the processor to perform-a method comprising:
(a) generating at least three fault tolerant messages for sending along at least one communication channel, wherein the generating comprises:
(i) obtaining a first initial message identifier;
(ii) mapping the initial message identifier to at least three different fault tolerant identifiers; and
(iii) using the at least three different fault tolerant identifiers to identify the at least three fault tolerant messages; and
(b) transmitting the at least three fault tolerant messages along the at least one communication channel.

25. A system comprising multiple computing nodes communicatively coupled to each other, wherein the multiple computing nodes are configured to collectively perform-a method comprising:
(a) generating at least three fault tolerant messages for sending along at least one communication channel, wherein the generating comprises:
(i) obtaining a first initial message identifier;
(ii) mapping the initial message identifier to at least three different fault tolerant identifiers; and (iii) using the at least three different fault tolerant identifiers to identify the at least three fault tolerant messages; and (b) transmitting the at least three fault tolerant messages along the at least one communication channel.

26. The system of claim 25, further comprising at least one bus via which the computing nodes are communicatively coupled to each other, wherein the at least one bus comprises a Controller Area Network bus and the initial message identifier is Controller Area Network identifier.

* * * * *